United States Patent
Anekoji

(10) Patent No.: US 7,978,793 B2
(45) Date of Patent: Jul. 12, 2011

(54) METHOD FOR GENERATING SOFT DECISION SIGNAL FROM HARD DECISION SIGNAL IN A RECEIVER SYSTEM

(75) Inventor: Fumio Anekoji, Naka-gun (JP)

(73) Assignee: Freescale Semiconductor, Inc., Austin, TX (US)

( * ) Notice: Subject to any disclaimer, the term of this patent is extended or adjusted under 35 U.S.C. 154(b) by 788 days.

(21) Appl. No.: 12/026,556

(22) Filed: Feb. 6, 2008

(65) Prior Publication Data

US 2009/0196380 A1    Aug. 6, 2009

(51) Int. Cl.
*H04L 27/06* (2006.01)
*H03M 13/00* (2006.01)

(52) U.S. Cl. ........ 375/341; 375/340; 714/777; 714/780; 714/794; 714/795

(58) Field of Classification Search .................. 375/262, 375/265, 340, 341; 714/759, 760, 777, 780, 714/794, 795
See application file for complete search history.

(56) References Cited

U.S. PATENT DOCUMENTS

| | | | |
|---|---|---|---|
| 6,307,901 B1 | 10/2001 | Yu et al. | |
| 6,671,852 B1 | 12/2003 | Ariel et al. | |
| 6,738,948 B2 | 5/2004 | Dinc et al. | |
| 6,757,337 B2 | 6/2004 | Zhuang et al. | |
| 6,829,313 B1 | 12/2004 | Xu | |
| 6,868,132 B1 | 3/2005 | Classon et al. | |
| 6,901,117 B1 | 5/2005 | Classon et al. | |
| 6,950,476 B2 | 9/2005 | Tarrab et al. | |
| 7,243,288 B1 | 7/2007 | Fontaine et al. | |
| 7,243,295 B2 | 7/2007 | Yellin et al. | |
| 7,249,311 B2 | 7/2007 | Lamy | |
| 7,260,762 B2 | 8/2007 | Desai et al. | |
| 7,269,127 B2 | 9/2007 | Mody et al. | |
| 7,277,508 B2 | 10/2007 | Berens et al. | |
| 7,321,644 B2 | 1/2008 | Love et al. | |
| 2002/0122510 A1* | 9/2002 | Yakhnich et al. | ............. 375/342 |
| 2002/0154704 A1* | 10/2002 | Reshef | ............. 375/262 |
| 2002/0194567 A1 | 12/2002 | Yellin et al. | |
| 2004/0199856 A1 | 10/2004 | Yellin et al. | |

* cited by examiner

*Primary Examiner* — Young T. Tse

(74) *Attorney, Agent, or Firm* — Charles Bergere

(57) ABSTRACT

A receiver system, which generates a soft decision signal from a hard decision signal, includes a hard output receiver for determining a received bit to generate a hard decision signal. A hard input soft output receiver determines an estimated probability of symbol data corresponding to the received bit based on the hard decision signal and generates a soft decision signal represented by a log-likelihood ratio from the estimated probability.

13 Claims, 4 Drawing Sheets

METHOD FOR GENERATING SOFT DECISION SIGNAL FROM HARD DECISION SIGNAL IN A RECEIVER SYSTEM

BACKGROUND OF THE INVENTION

The present invention relates to a hard input soft output (HISO) receiver for generating a soft decision signal from a hard decision signal in a receiver system.

In the prior art, in a wired or wireless communication system, a receiver system may be a hard output receiver or soft output receiver, which checks each bit in a sequence of received signals and generates a hard decision value or soft decision value for the received bit. The receiver system further includes a soft input or hard input error correction code (ECC) decoder, which corrects errors using a decoding algorithm that corresponds to the bit decision value (hard decision value or soft decision value) output from the receiver.

FIG. 1 is a schematic circuit block diagram of a prior art receiver system 100 that uses a hard input ECC decoder 140. The receiver system 100 includes a limiter amplifier 110, a hard output (HO) receiver 120, a hard input hard output (HIHO) receiver 130, and the hard input ECC decoder 140. The receiver system 100 receives a signal Rx transmitted from a transmitter (not shown) over a wired or wireless communication channel. Then, the receiver system 100 amplifies the received signal Rx to a fixed amplitude value with the limiter amplifier 110. The Ho receiver 120 uses a threshold value to determine the reception level of the amplified signal Rx to generate a hard decision signal $S_h$.

The HIHO receiver 130 estimates, based on the hard decision signal $S_h$, the sign (+1 or −1) of each bit $y_k$ in a reception signal sequence y ($y=\{y_1, y_2, \ldots y_N\}$) to generate a bit estimate value $eu_k$. Specifically, for a hard decision signal $S_h$ corresponding to bit $y_k$, the HIHO receiver 130 obtains a plurality of oversampling bits by asynchronously oversampling, for example, 8 or 16 samples per bit. This improves the bit error rate (BER) caused by the influence of additive white Gaussian noise (AWGN), which is added to the reception signals Rx in the communication channel. The HIHO receiver 130 then calculates from the plurality of obtained oversampling bits the Hamming distance $D_h$ of the sample sequence through reciprocal operations of an adder 132 and a bit counter 134. Further, the HIHO receiver 130 calculates the bit estimate value $eu_k$ based on the Hamming distance $D_h$ with a hard decision circuit 136.

The ECC decoder 140 performs error correction on bit $y_k$ using the bit estimate value $eu_k$, that is, the hard decision value output from the HIHO receiver 130. In this case, the error correction mechanism implemented by the ECC decoder 140 may be, for example, a maximum likelihood decoding (MLD) scheme that uses a hard decision Viterbi, a boundary distance decoding (BDD) scheme, or the like. In the boundary distance decoding scheme, an error correction code, such as Hamming, Reed/Solomon, Bose Chaudhuri-Hocquenghem (BCH), or the like, is used.

A decoding algorithm that uses a hard decision value, such as that of the receiver system 100 of FIG. 1 is problematic inasmuch as there is a limit to the error correction capability due to the signal-to-noise ratio and bit error ratio. Although the redundant bits may be increased to improve the error correction capability, this would lower the coding efficiency. Accordingly, to apply the receiver system to a high-speed error correction device, the use of a soft input ECC decoder that performs error correction using soft decision values, which are more accurate than hard decision values, has been proposed.

FIG. 2 is a schematic block circuit diagram of a prior art receiver system 200 that includes a soft input ECC decoder 240. The receiver system 200 includes an AGC amplifier 210, a soft output (SO) receiver 220, soft input soft output (SISO) receiver 230, and the ECC decoder 240.

The SO receiver 220 includes an analog-to-digital converter (ADC) 222, which determines the reception level of a signal RX amplified by the. AGC amplifier 210 and converts the analog reception signal Rx to a digital value (reception signal sequence y, where $y=\{y_1, y_2, \ldots y_N\}$). Preferably, the ADC 222 has an AD conversion capability of six bits or greater to ensure high level error correction. The digital signal value output from the ADC 222, that is, each bit $y_k$ of the reception signal sequence y, corresponds to a soft decision value.

The SISO receiver 230 calculates a log-likelihood ratio (LLR) $L_c y_k$, which represents the logarithmic ratio of the probability that the received bit $y_k$ is +1 or −1, based on the output signal of the ADC 222 and the gain (as required) of the AGC amplifier 210. Specifically, the SISO receiver 230 calculates the Euclidean distance of the bit $y_k$ and the estimate value of the bit $y_k$ using a Euclidean distance calculator 232. Further, the SISO receiver 230 uses a CSI (Channel State Information) calculator 234 to calculate the S/N ratio, or channel state information $L_c$ indicating the quality of the communication channel. Then, the SISO receiver 230 uses a multiplier 236 to multiply the calculated Euclidean distance by the channel state information $L_c$ and obtain the LLR ($L_c y_k$), which is represented by equation 1 shown below. The LLR ($L_c y_k$) represents the sign and absolute value of the bit $y_k$.

$$L_c y_k = \ln\left(\frac{P(y_k | u_k = +1)}{P(y_k | u_k = -1)}\right) = \ln\left(\frac{\exp\left(-\frac{(y_k - m)^2}{2\sigma^2}\right)}{\exp\left(-\frac{(y_k + m)^2}{2\sigma^2}\right)}\right) = \quad \text{Equation 1}$$

$$-\frac{(y_k - m)^2}{2\sigma^2} + \frac{(y_k + m)^2}{2\sigma^2} = \frac{2m}{\sigma^2} y_k = \frac{2m^2}{\sigma^2} y_{nk}$$

In equation 1, $P(y_k|u_k=+1)$ represents the probability of bit $y_k$ being received when "+1" symbol data $u_k$ is transmitted. $P(y_k|u_k=-1)$ represents the probability of bit $y_k$ being received when "−1" symbol data $u_k$ is transmitted. In the equation, "m" represents the average value of bit $y_k$, "$\sigma^2$" represents the variance value of bit $y_k$, that is, the transmission noise. "$y_{nk}$" is the value of bit $y_k$ standardized by the average value m and represented by $y_{nk}=y_{k/m}$.

The soft input ECC decoder 240 performs error correction of the bit $y_k$ using the LLR ($L_c y_k$), that is, a soft decision value output from the SISO receiver 230. In this case, the error correction mechanism that may be implemented by the ECC decoder 240 is, for example, the maximum likelihood decoding scheme using the soft decision Viterbi. The error correction mechanism may also be turbo decoding or low density parity check (LDPC) that performs repetitive decoding using maximum a posteriori probability (MAP) decoding or belief propagation decoding (BPD).

The receiver system 200 that uses the SISO receiver 230 requires a high performance ADC 222 (for example, ADC of six bits or eight bits or more) to ensure a high level of error correction capability and the AGC amplifier 210 to provide the ADC 222 with a signal having an appropriate level. This increases the product cost as compared to the receiver system 100 (FIG. 1). Large-scale modification is also required when the soft input ECC decoder 240 shown in FIG. 2 is applied to the receiver system 100. Such modification increases design costs and prolongs development time. Accordingly, it is desired that a receiver system capable of using a soft input ECC decoder without an ADC and an AGC amplifier be developed.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
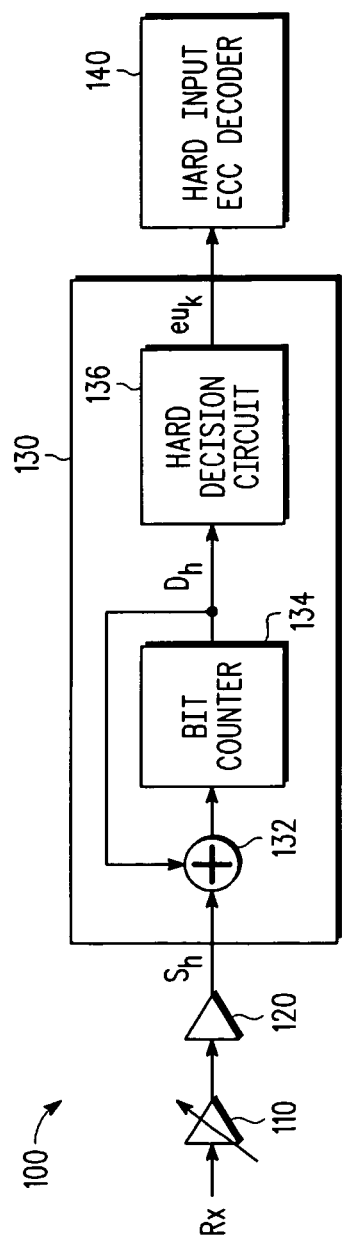
FIG. 1 is a schematic block circuit diagram of a receiver system in the prior art.

In the drawings, like numerals are used for like elements throughout.

The present invention provides a receiver system capable of using a soft input ECC decoder without an ADC and an AGC amplifier.

One aspect of the present invention is a receiver system for generating a soft decision signal from a hard decision signal. The receiver system includes a hard output receiver for determining a received bit to generate a hard decision signal. A hard input soft output receiver determines an estimated probability of symbol data corresponding to the received bit based on the hard decision signal and generates a soft decision signal represented by a log-likelihood ratio from the estimated probability.

A further aspect of the present invention is a method for generating a soft decision signal from a hard decision signal. The method includes determining a received bit to generate a hard decision signal, determining an estimated probability of symbol data corresponding to the received bit based on the hard decision signal, and generating a soft decision signal represented by a log-likelihood ratio from the estimated probability of the symbol data.

Other aspects and advantages of the present invention will become apparent from the following description, taken in conjunction with the accompanying drawings, illustrating by way of example the principles of the invention.

Figure 3:
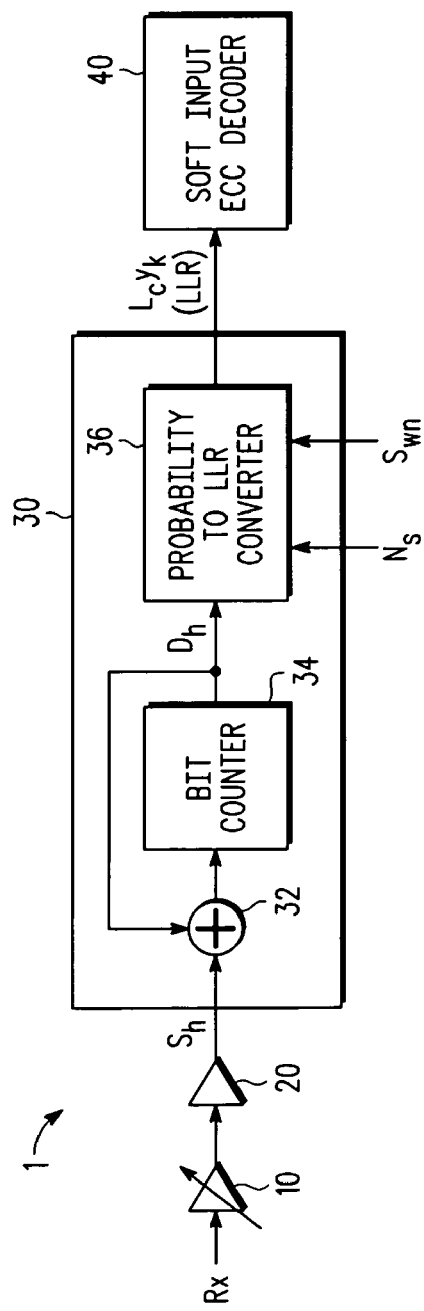
FIG. 3 is a schematic block circuit diagram of a receiver system according to a preferred embodiment of the of the present invention.

A preferred embodiment of a receiver system 1 according to a preferred embodiment of the present invention will now be discussed with reference to the drawings. FIG. 3 is a schematic block circuit diagram of the receiver system 1. The receiver system 1 includes a limiter amplifier 10, a hard output (HO) receiver 20, a hard input soft output (HISO) receiver 30, and soft input ECC decoder 40. The receiver system 1 receives signals Rx transmitted by a transmitter (not shown) over a communication channel, either wireless or wired, and amplifies the reception signals Rx to a fixed amplitude value using the limiter amplifier 10. The HO receiver 20 determines the reception level of the amplified signals Rx using a threshold value and generates a hard decision signal $S_h$.

Figure 2:
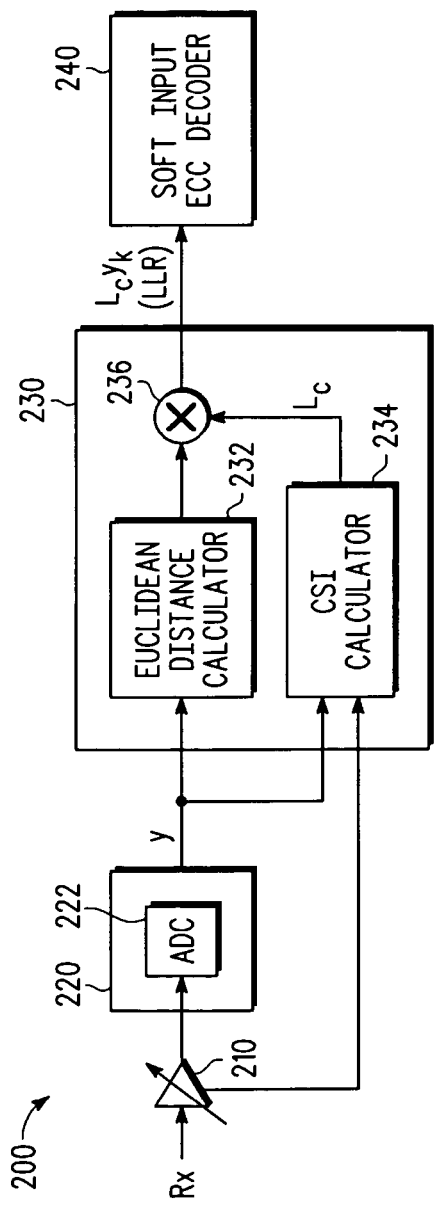
FIG. 2 is a schematic block circuit diagram of another receiver system in the prior art.

The HISO receiver 30 calculates the log-likelihood ratio (LLR) $L_c y_k$ of each bit in a reception signal sequence y ($y=\{y_1, y_2, \ldots y_N\}$) based on the hard decision signal $S_h$ generated by the HO receiver 20. The LLR ($L_c y_k$) represents the probability of a received bit $y_k$ being $\{+1 \text{ or } -1\}$ as described with reference to FIG. 2.

Specifically, the HISO receiver 30 performs asynchronous oversampling on the hard decision signal $S_h$ corresponding to a predetermined sampling number $N_s$ of the received bit $y_k$ to obtain a plurality of oversampling bits.

The HISO receiver 30 then calculates the Hamming distance $D_h$ for the sampling sequence of the received bit $y_k$ by reciprocal operations of an adder 32 and a bit counter 34. The Hamming distance $D_h$ actually represents the difference between the number of "+1" oversampling bits and the number of "−1" oversampling bits in the sampling sequence of the bit $y_k$. In the present embodiment, the adder 32 determines the total value of the sampling number $N_s$ of oversampling bits (+1 and −1). The bit counter 34 counts the oversampling number $N_s$ of bits and holds the output of the adder 32. As a result, the output of the bit counter 34 is obtained as the Hamming distance $D_h$ corresponding to the oversampling number $N_s$.

The HISO receiver 30 then obtains the LLR ($L_c y_k$) using a probability-log likelihood ratio (probability-LLR) converter 36 based on the sampling number $N_s$ and Hamming distance $D_h$ (and optimally, noise signal $S_{vn}$). The operating principle of the probability-LLR converter 36 will now be described.

The probability-LLR converter 36 first calculates estimate probabilities (a posteriori probabilities) $P_m$ and $P_p$ of the symbol data $u_k$ corresponding to the received bit $y_k$ according to equations 2 and 3, which are shown below, using the sampling number $N_s$ and the Hamming distance $D_h$.

$$P_m = P(u_k = -1 | y_k) = (N_s - D_h)/2N_s = m/N_s \quad \text{Equation 2}$$

$$P_p = P(u_k = +1 | y_k) = (D_h + N_s)/2N_s = p/N_s = (N_s - m)/N_s \quad \text{Equation 3}$$

Equation 2 represents the probability $P_m$ when the symbol data $u_k$ corresponding to the received bit $y_k$ is "−1", and "m" in equation 2 represents the number of "−1" bits included in the sampling sequence. Equation 3 represents the probability $P_p$ when the symbol data $u_k$ corresponding to the received bit $y_k$ is "+1", and "p" in equation 3 represents the number of "+1" bits included in the sampling sequence.

The probability-LLR converter 36 then calculates $L(u_k - y_k)$, which represents the LLR of the a posteriori probability $P(u_k | y_k)$, from equation 4, which is shown below, using the estimate probabilities $P_m$ and $P_p$ (equations 2 and 3).

$$L(u_k | y_k) = \ln\left(\frac{P(u_k = +1 | y_k)}{P(u_k = -1 | y_k)}\right) = \ln\frac{P_p}{P_m} \quad \text{Equation 4}$$

In equation 4, $P(u_k = +1 | y_k)$ and $P(u_k = -1 | y_k)$ are respectively converted into the next equations using the Bayes theorem.

$$P(u_k = +1 \mid y_k) = \frac{P(y_k \mid u_k = +1)P(u_k = +1)}{P(y_k)}$$

$$P(u_k = -1 \mid y_k) = \frac{P(y_k \mid u_k = -1)P(u_k = -1)}{P(y_k)}$$

Accordingly, equation 4 is converted to equation 5, which is shown below.

$$L(u_k \mid y_k) = \ln\left(\frac{P(y_k \mid u_k = +1)}{P(y_k \mid u_k = -1)}\right) + \ln\left(\frac{P(u_k = +1)}{P(u_k = -1)}\right) \quad \text{Equation 5}$$

In equation 5, the first expression on the right side represents the LLR ($L_c y_k$) (refer to equation 1), and the second expression on the right side represents the LLR ($L(u_k)$) of the a priori probability $P(u_k)$. Thus, equation 5 can be represented by equation 6, which is shown below.

$$L(u_k \mid y_k) = L_c y_k + L(u_k) \quad \text{Equation 6}$$

The occurrence probability of $\{+1, -1\}$ for the symbol data $u_k$ is equal. Thus, it can be concluded that $L(u_k) = 0$ is satisfied. Accordingly, equation 6 may be expressed in the form of equation 7, which is shown below.

$$L_c y_k = L(u_k \mid y_k) \quad \text{Equation 7}$$

Accordingly, the LLR ($L_c y_k$) of the received bit $y_k$ may be determined from the LLR ($L(u_k \mid y_k)$) of the a posteriori probability $P(u_k \mid y_k)$, which is shown in equation 4. In this case, the estimate value $E(u_k)$ of the symbol data $u_k$ is expressed using $L(u_k \mid y_k)$ in equation 8, which is shown below.

$$E(u_k) = \tanh(L(u_k \mid y_k)/2) = \frac{e^{L(u_k \mid y_k)/2} - e^{-L(u_k \mid y_k)/2}}{e^{L(u_k \mid y_k)/2} + e^{-L(u_k \mid y_k)/2}} \quad \text{Equation 8}$$

Equation 8 may be expressed as equation 9, which is shown below, when equation 4 is substituted in equation 8.

$$E(u_k) = \tanh(L(u_k \mid y_k)/2) = \frac{P_p - P_m}{P_p + P_m} = P_p - P_m \quad \text{Equation 9}$$

The estimate value $E(u_k)$ is determined from the difference between the estimate probabilities $P_m$ and $P_p$. In this case, equation 9 is converted to equation 10 by substituting equations 2 and 3 in equation 9.

$$\tan h(L(u_k \mid y_k)/2) = P_p - P_m = p/N_s - m/N_s = (N_s - 2m)/N_s \quad \text{Equation 10}$$

In equation 10, "$N_s - 2m$" corresponds to the Hamming distance $D_h$ (more precisely, Hamming distance difference) Equation 10 is converted to equation 11 using $D_h$.

$$\tan h(L(u_k \mid y_k)/2) = D_h/N_s \quad \text{Equation 11}$$

Accordingly, the LLR ($L_c y_k$) of the received bit $y_k$ is determined from equations 7 and 11 using equation 12.

$$L_c y_k = L(u_k \mid y_k) = 2a \tan h(D_h/N_s) \quad \text{Equation 12}$$

The probability-LLR converter 36 calculates the difference $D_h/N_s$ of the estimate probabilities $P_m$ and $P_p$ of the symbol data $u_k$. Then, the probability-LLR converter 36 calculates the LLR ($L_c y_k$) of the received bit $y_k$ by obtaining a value that is two time greater than the hyperbolic tangent (a tan h) of the probability difference $D_h/N_s$. In other words, the HISO receiver 30 obtains the soft decision signal $L_c y_k$ from the hard decision signal $S_h$ generated by the HO receiver 20 through reciprocal operation of the adder 32, bit counter 34, and probability-LLR converter 36. The $L_c y_k$ has essentially the same characteristics value as the output of the conventional SISO receiver 230 described in FIG. 2.

The probability-LLR converter 36 will now be described in detail.

Figure 4:
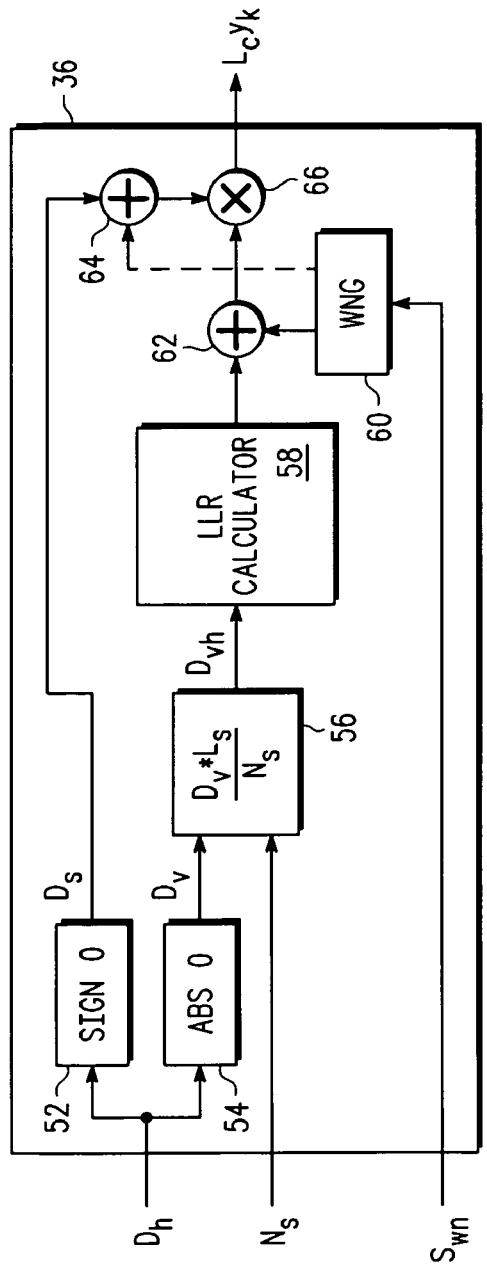
FIG. 4 is a schematic block circuit diagram of a probability-LLR converter shown in FIG. 3.

Referring to FIG. 4, the probability-LLR converter 36 includes a first decision unit 52, a second decision unit 54, a scaler 56, an LLR calculator 58, a white noise generator 60, a first adder 62, a second adder 64, and a multiplier 66. The structural elements of the probability-LLR converter 36 may be implemented in software operating in a microprocessor or hardware, such as an ASIC or the like.

The first decision unit 52 determines the sign of the Hamming distance $D_h$ (that is, the output of bit counter 34 after oversampling) related to the probability of symbol data $u_k$ to generate a sign decision signal $D_s$. The second decision unit 54 determines the absolute value of the Hamming distance $D_h$ to generate an absolute value decision signal $D_v$.

The scaler 56 scales the absolute value decision signal $D_v$ in accordance with the sampling number $N_s$. Specifically, scaling values $L_s$ corresponding to the maximum sampling number of the HISO receiver 30 is set beforehand in the scaler 56. The scaler 56 scales the absolute value decision signal $D_v$ corresponding to the sampling number $N_s$ using the scaling value $L_s$. Then, the scaler 56 generates a scaled signal $D_{vh}$, which is represented by equation 13 shown below. In the present embodiment, the scaling value $L_s$ is set at "16".

$$D_{vh} = D_v * L_s / N_s \quad \text{Equation 13}$$

In one embodiment, the LLR calculator 58 is implemented with a look-up table T1 (refer to table 1 shown below) and the absolute value of the LLR ($L_c y_k$) is derived from table T1 using the scaled signal $D_{vh}$ from the scaler 56.

TABLE 1

| (Look-Up Table T1) | | |
| --- | --- | --- |
| $D_{vh}$ ($D_v * 16/N_s$) | $D_{vh}/16$ | 2atanh ($D_{vh}/16$) |
| 0 | 0.0001 | 0.0002 |
| 1 | 0.0625 | 0.1252 |
| 2 | 0.1250 | 0.2513 |
| 3 | 0.1875 | 0.3795 |
| 4 | 0.2500 | 0.5108 |
| 5 | 0.3125 | 0.6466 |
| 6 | 0.3750 | 0.7885 |
| 7 | 0.4375 | 0.9383 |
| 8 | 0.5000 | 1.0986 |
| 9 | 0.5625 | 1.2730 |
| 10 | 0.6250 | 1.4663 |
| 11 | 0.6875 | 1.6864 |
| 12 | 0.7500 | 1.9459 |
| 13 | 0.8125 | 2.2687 |
| 14 | 0.8750 | 2.7081 |
| 15 | 0.9375 | 3.4340 |
| 16 | 0.9951 | 6.0092 |

In table 1, the values in the left column are the scaled signals $D_{vh}$. $D_{vh}/16$ shown in the center column corresponds to the difference between the estimate probabilities $P_m$ and $P_p$ of the symbol data. $u_k$, that is, the probability value $D_h/N_s$ of equation 12. 2a tan $h(D_{vh}/16)$ shown in the right hand column is the LLR ($L_c y_k$) derived from the probability value $D_h/N_s$. When the probability value $D_h/N_s$ is 0, $L_c y_k$ also becomes 0. To prevent $L_c y_k$ from becoming 0, $D_{vh}/16$ is set at "0.0001" when $D_{vh}$ is 0. When $D_h$ is 16, 2a tan $h(D_{vh}/16)$ is set at "6.0092" so that 2a tan $h(D_{vh}/16)$ does not become infinite.

Without calculating 2a tan h($D_{vh}$/16) as shown in equation 12, the LLR calculator 58 obtains the absolute value of $L_c y_k$ corresponding to the scaled signal $D_{vh}$ by referring to the table T1. For example, when $L_s$=16, $N_s$=8, and $D_v$=2 are satisfied, the scaled signal $D_{vh}$ is 4 (refer to equation 13). In this case, the LLR calculator 58 derives "0.5108" from table T1 based on the scaled signal $D_{vh}$.

The white noise generator (WNG) 60 generates white noise WN from the noise signal $S_{wn}$, which is provided from an external circuit (not shown). A first adder 62 adds the white noise WN to the $L_c y_k$ (absolute value) derived from the LLR calculator 58. The $L_c y_k$ may be randomly dispersed by the white noise addition process. This increases the correlation between the $L_c y_k$ and the symbol data $u_k$ and improves the convergence of the $L_c y_k$.

When the output ($D_h$) of the bit counter 34 is 0, the white noise WN generated by the WNG 60 is added to the sign decision signal $D_s$ by the second adder 64. Therefore, the sign of $L_c y_k$ is randomly determined even when $D_h$ is 0. The multiplier 66 multiplies the output value (absolute value of $L_c y_k$) of the first adder 62 and the output value (sign of $L_c y_k$) of the second adder 64 to generate the LLR ($L_c y_k$).

The soft input ECC decoder 40 performs error correction on the bit $y_k$ using the LLR ($L_c y_k$), that is, the soft decision value output from the HISO receiver 30. For example, the ECC decoder 40 may implement the maximum likelihood decoding scheme using the soft decision Viterbi. Alternatively, the ECC decoder may implement turbo decoding or low density parity check (LDPC) that performs maximum a posteriori probability (MAP) decoding or repetitive decoding using belief propagation decoding (BPD). Accordingly, the receiver system 1 of the present invention is capable of performing a high level of error correction using an LLR ($L_c y_k$) such as that calculated by the HISO receiver 30 without using an AD converter and an AGC amplifier.

Figure 5:
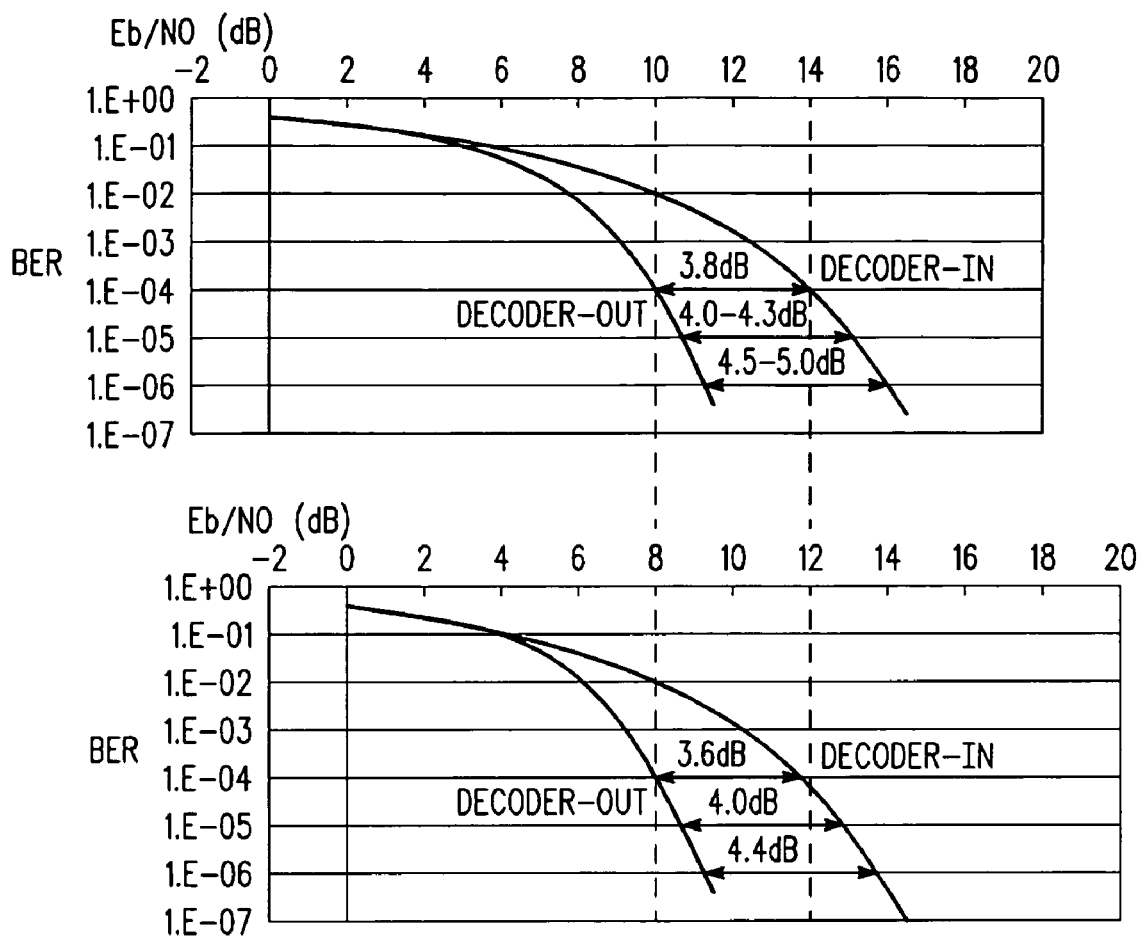
FIG. 5 is a graph showing a decoded gain for the receiver system of the preferred embodiment and a decoded gain for the receiver system of the prior art.

FIG. 5 is a graph showing the coded gain characteristics of the receiver system 1.

The upper graph in FIG. 5 shows the output gain characteristics (decoder-in) of the HISO receiver 30 and the output gain characteristics (decoder-out) of the soft input ECC decoder 40. The lower graph of FIG. 5 shows the output gain characteristics (decoder-in) of the SISO receiver 230 (FIG. 2) and the output gain characteristics (decoder-out) of the soft input ECC decoder 240 in the prior art receiver system 200. The horizontal axis shows the ratio of the reception power Eb and noise output power density No, and the vertical axis shows the bit error rate (BER). As shown in FIG. 5, the BER characteristics improve when error correction is performed using the output of the HISO receiver 30 to the same degree as when error correction is performed using the output of the prior art SISO receiver 230.

Figure 6:
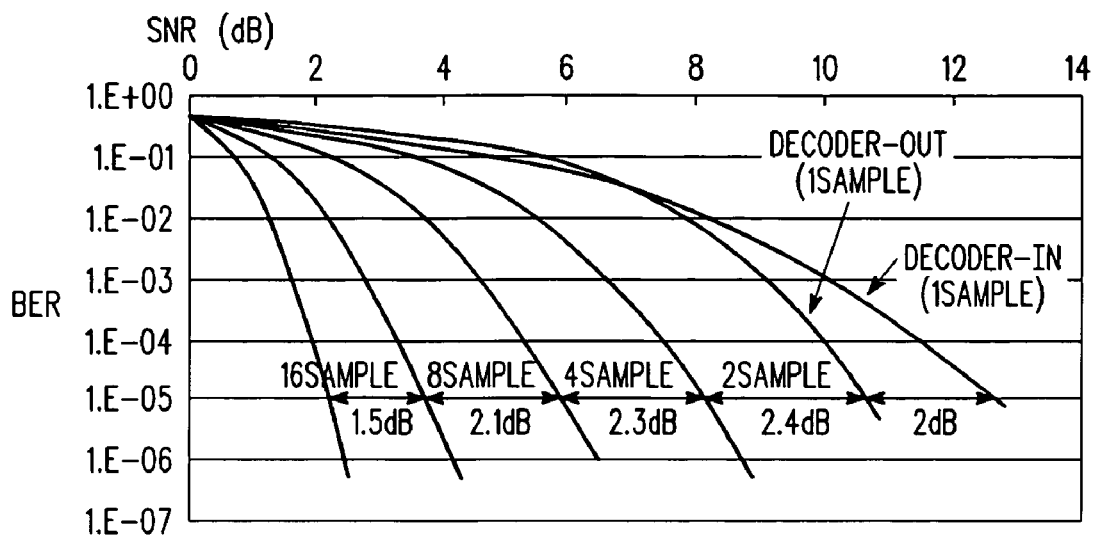
FIG. 6 is a graph showing the decoded gain when the number of oversamples is changed.

FIG. 6 is a graph showing the coded gain characteristics of the receiver system 1 when the oversampling number $N_s$ is varied. The rightmost curve of FIG. 6 shows the output gain characteristics of the HISO receiver 30. The other curves show the output gain characteristics of the ECC decoder 40 when the oversampling number $N_s$ is sequentially changed to 1, 2, 4, 8, and 16 from the right. The horizontal axis shows the S/N ratio, and the vertical axis shows the BER. It is apparent from FIG. 6 that the BER characteristics are improved by increasing the oversampling number $N_s$.

A configuration for an HISO receiver 30 according to a further embodiment of the present invention will now be described. In the HISO receiver 30, the LLR calculator 58 calculates the LLR ($L_c y_k$) from the scaled value $D_{vh}$ by implementing linear approximation.

Figure 7:
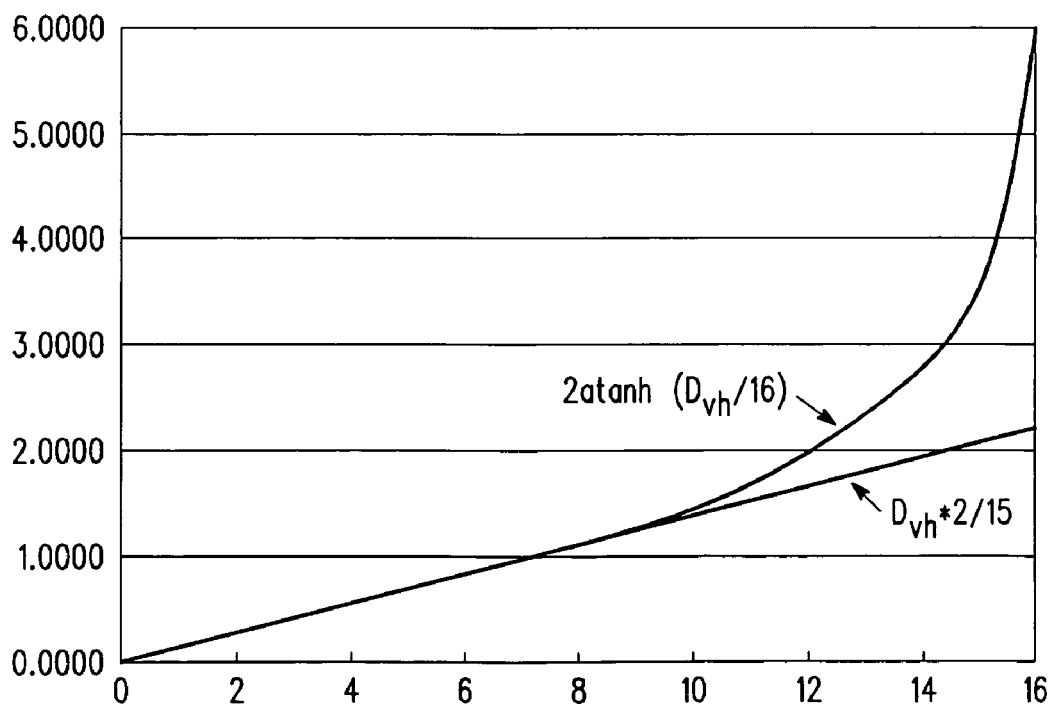
FIG. 7 is a graph illustrating the linear approximation scheme using a probability-LLR converter according to a further embodiment of the present invention.

As shown in FIG. 7, the curve of the LLR ($L_c y_k$) shown at 2a tan h($D_{vh}$/16), for example, can be approximated as a straight line having an inclination of 2/15 using the equation shown below.

$$L_c y_k = D_{vh} * 2/15 \qquad \text{Equation 14}$$

The LLR calculator 58 calculates the absolute value of $L_c y_k$ by implementing linear approximation as represented in equation 14 instead of using the above-described table T1. In this case, the LLR calculator 58 sets the $L_c y_k$ to "0.0002" when $D_{vh}$ is "0" and sets the $L_c y_k$ to "6.0092" when $D_{vh}$ is "16" in the same manner as when using the table T1. It is preferable that $L_c y_k$ be corrected when $D_{vh}$ is in the range of 12 to 16.

As described above, the receiver system 1 of the present invention includes the HISO receiver 30 for calculating the probabilities $P_m$ and $P_p$ of the symbol data uk being {+1, −1} from the hard decision signal $S_h$ generated by the HO receiver 20 and converting the probabilities $P_m$ and $P_p$ to a soft decision signal ($L_c y_k$). Accordingly, the soft input ECC decoder 40 may perform sophisticated error correction using the output of the HISO receiver 30 instead of using an AD converter and an AGC amplifier.

Further, in the present invention, there is no need for drastic modifications of the receiver system 140 even when the soft decision ECC decoder 40 is integrated into the receiver system 140 shown in FIG. 1. In this case, for example, the hard decision circuit 136 shown in FIG. 1 may simply be changed to the probability-LLR converter 36 shown in FIG. 3. This controls the product cost, shortens the development time and lowers the design cost.

It should be apparent to those skilled in the art that the present invention may be embodied in many other specific forms without departing from the spirit or scope of the invention. Particularly, it should be understood that the present invention may be embodied in the following forms.

The maximum oversampling number (scaling value $L_s$) is not limited to "16".

The LLR calculator 58 is not limited to calculating a soft decision signal ($L_c y_k$) using the table T1 (refer to Table 1) or linear approximation (refer to FIG. 7). The LLR calculator 58 may directly calculate a soft decision signal ($L_c y_k$) in accordance with equation 12.

The noise addition process using the noise signal $S_{wn}$ does not necessarily have to be implemented.

The present examples and embodiments are to be considered as illustrative and not restrictive, and the invention is not to be limited to the details given herein, but may be modified within the scope and equivalence of the appended claims.

What is claimed is:

1. A receiver system for generating a soft decision signal from a hard decision signal, the receiver system comprising:
    a hard output receiver for determining a received bit to generate the hard decision signal; and
    a hard input soft output receiver for determining an estimated probability of symbol data corresponding to the received bit based on the hard decision signal and for generating the soft decision signal represented by a log-likelihood ratio from the estimated probability,
    wherein the hard input soft output receiver includes:
    an adder, connected to the hard output receiver, for receiving the hard decision signal;
    a bit counter connected to the adder, wherein the bit counter and the adder oversample the received bit using a predetermined sampling number to calculate a Hamming distance for the sampling sequence of the received bit; and a probability-log likelihood ratio converter, connected to the bit counter, for determining the estimated probability of the symbol data based on the Hamming distance and the sampling number and generating the soft decision signal from the estimated probability.

2. The receiver system according to claim 1, wherein the hard input soft output receiver determines a first estimated probability indicating the probability of the symbol data being positive and a second estimated probability indicating the probability of the symbol data being negative, and the hard input soft output receiver generates the soft decision signal by calculating the log-likelihood ratio of the difference between the first estimated probability and the second estimated probability.

3. The receiver system according to claim 1, wherein the hard input soft output receiver generates the soft decision signal based on the equation of $L_c y_k = 2a \tan h(D_h/N_s)$, where $L_c y_k$ represents the soft decision signal of the received bit, a tan h is a hyperbolic tangent, $D_h$ represents the Hamming distance, and $N_s$ represents the sampling number.

4. The receiver system according to claim 1, wherein the hard input soft output receiver further generates the soft decision signal based on a noise signal which generates white noise.

5. The receiver system according to claim 1, wherein the probability-log likelihood ratio converter includes:
a first decision unit for determining the sign of the Hamming distance to generate a sign decision signal;
a second decision unit for determining the absolute value of the Hamming distance to generate an absolute value decision signal;
a scaler, connected to the second decision unit, for scaling the absolute value decision signal in accordance with the sampling number to generate a scaled signal;
a log-likelihood ratio calculator, connected to the scaler, for calculating the absolute value of the soft decision signal based on the scaled signal; and
a multiplier for multiplying the absolute value of the soft decision signal by the sign decision signal to generate the soft decision signal.

6. The receiver system according to claim 5, wherein the log-likelihood ratio calculator includes a pre-recorded table of a plurality of soft decision values calculated in accordance with the Hamming distance, the sampling number, and a scaling value of the scaler, the log-likelihood ratio calculator obtaining one of the plurality of soft decision values as the soft decision signal based on the scaled signal.

7. The receiver system according to claim 5, wherein the log-likelihood ratio calculator functions as a linear approximator for obtaining the soft decision signal that corresponds to the scaled signal.

8. A method for generating a soft decision signal from a hard decision signal, the method comprising:

determining a received bit to generate the hard decision signal;
oversampling the received bit by a predetermined sampling number to calculate a Hamming distance for the sampling sequence of the received bit;
determining an estimated probability of symbol data corresponding to the received bit based on the hard decision signal; and
generating the soft decision signal represented by a log-likelihood ratio from the estimated probability of the symbol data, the Hamming distance and the sampling number, and wherein said generating the soft decision signal includes:
determining the sign of the Hamming distance to generate a sign decision signal;
determining the absolute value of the Hamming distance to generate an absolute value decision signal;
scaling the absolute value decision signal in accordance with the sampling number to generate a scaled signal;
calculating the absolute value of the soft decision signal based on the scaled signal; and
multiplying the absolute value of the soft decision signal by the sign decision signal to generate the soft decision signal.

9. The method according to claim 8, wherein:
said determining the estimated probability includes:
determining a first estimated probability indicating the probability of the symbol data being positive; and
determining a second estimated probability indicating the probability of the symbol data being negative; and
said generating the soft decision signal includes:
calculating the log-likelihood ratio of the difference between the first estimated probability and the second estimated probability.

10. The method according to claim 8, wherein said generating the soft decision signal includes generating the soft decision signal based on the equation of $L_c y_k = 2a \tan h(D_h/N_s)$, where $L_c y_k$ represents the soft decision signal of the received bit, a tan h is a hyperbolic tangent, $D_h$ represents the Hamming distance, and $N_s$ represents the sampling number.

11. The method according to claim 8, wherein said generating the soft decision signal further includes generating the soft decision signal based on a noise signal which generates white noise.

12. The method according to claim 8, wherein said calculating the absolute value of the soft decision signal includes obtaining the soft decision signal corresponding to the scaled signal from a table.

13. The method according to claim 8, wherein said calculating the absolute value of the soft decision signal includes obtaining the soft decision signal corresponding to the scaled signal through linear approximation.

* * * * *